(No Model.)
J. R. HICKS.
ROTARY HARROW.
No. 369,600. Patented Sept. 6, 1887.
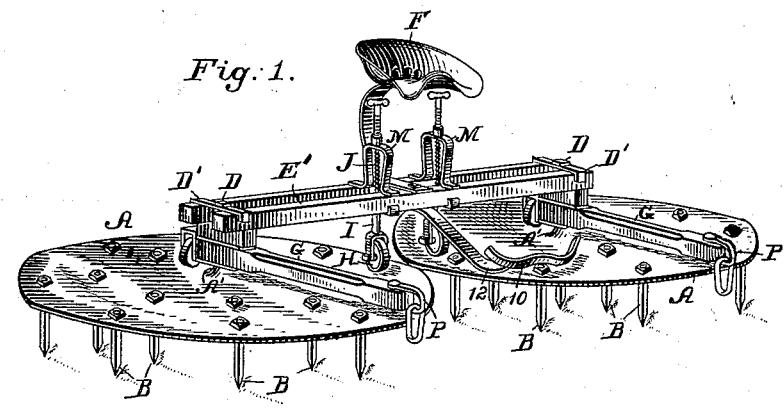
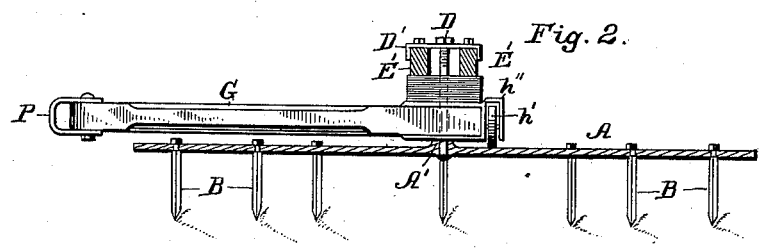
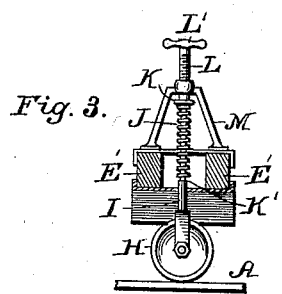
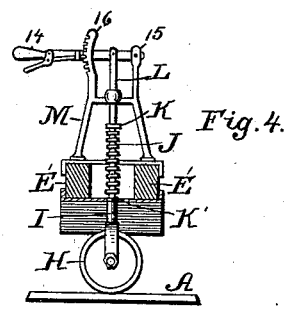
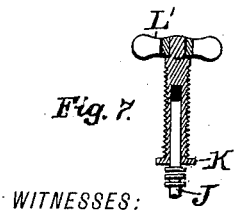
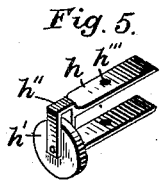
WITNESSES:
F. G. Fischer
Frank C. Rhodes
INVENTOR
James R. Hicks
BY J. V. Higdon
ATTORNEY.

UNITED STATES PATENT OFFICE.

JAMES R. HICKS, OF KANSAS CITY, MISSOURI.

ROTARY HARROW.

SPECIFICATION forming part of Letters Patent No. 369,600, dated September 6, 1887.

Application filed May 20, 1887. Serial No. 238,819. (No model.)

*To all whom it may concern:*

Be it known that I, JAMES R. HICKS, of Kansas City, Jackson county, State of Missouri, have invented certain new and useful Improvements in Rotary Harrows, of which the following is a full, clear, and exact description, reference being had to the accompanying drawings, forming a part thereof.

This invention relates to that class of harrows in which rotating wheels carrying teeth are put in motion by the forward movement of the implement in connection with pressure-wheels; and it may be said to consist in the devices and the combination and arrangement of devices hereinafter described, and pointed out in the claims.

In the drawings which illustrate the manner of carrying out my invention, Figure 1 is a perspective view of a double rotary harrow embodying the different elements which make up the invention. Fig. 2 is a side elevation of one harrow, showing the cross-frame and the metal disk which carries the teeth in section. Fig. 3 is a detail view showing one of the pressure-wheels and the improved adjusting and operating devices therefor. Fig. 4 is also a detail view, but showing one of the pressure-wheels fitted with a varied form of adjusting and operating devices. Fig. 5 is a detail view in perspective of a device that is located upon the rear end of the draft-beam. Fig. 6 is a detail view of a tooth, showing the manner of securing it to the metallic harrow-frame; and Fig. 7 is a detail showing the construction and operation of the adjusting-tube.

Although the devices making up my invention are designed to be used more particularly in the form of a double harrow, yet I may say that they can easily be arranged to operate in connection with what is commonly known as a "single" rotary harrow; but in the following description I shall mostly refer to the double harrow, as shown in Fig. 1.

A represents the frame of the harrows, which of course may be of any usual form, but which in this instance consists in a metal plate provided with a raised portion at or near the center of its upper side, and in which the teeth B are fixed to project downward therefrom. The raised portion A', at the center of plate A, can either be formed integral with the said plate or it can be formed separate therefrom. Said plate may be made in any suitable way, of cast-iron or sheet metal, although I prefer to construct it of sheet-steel, as that material will permit it to be comparatively light and at the same time very strong. The teeth B are constructed with a pin, $a$, at their upper end for entering the apertures in the plate, and are provided with a shoulder, $a'$, which bears against the under surface of said plate. The upper ends of said teeth are to be secured in the apertures in the plate in any desired way, although I prefer to provide their pins $a$ with a thread and nut, as shown, and draw the shoulder $a'$ firmly against the under side of the plate therewith. A harrow-frame thus formed will be practically indestructible, and will last a life-time.

Both of the tooth-plates A are pivoted to revolve on bolts D, which pass up through a cross beam or frame, E, on which the rider's seat F is fixed. Said frame consists in two parallel bars, E', which are held at proper distance apart by straps D' and suitable retaining-bolts. A foot-rest, 10, is located upon a bar, 12, so as to project in front of the seat F convenient for the rider, and the rear end of said bar extends from one of the parallel bars E' to the other, and suitable bolts are passed through it and the bars, which construction not only attaches said foot-rest to said frame, but the bars are thereby held at proper distance from each other at the center of their length, making the parts strong without adding unnecessarily to the weight.

G G are draft-bars or clevis-bars, pivoted upon bolts D between the tooth-plates and frame E, and extending their clevises P sufficiently beyond the circumference of said plates to keep the attachments free of the harrows, whether the team is pulling straight ahead or turning a corner.

$h$ indicates a metal strap, which is located upon the rear end of the clevis-bars, and which is provided with a fork, $h''$, at its rear end. A small wheel or roller, $h'$, is journaled in the fork of said strap, and is adapted to roll around upon the upper surface of the harrow-plate or upon a suitable track located thereon for the purpose. The strap $h$ is provided with apertures $h'''$ for the passage of the pivot-bolt D, and may be secured to the clevis-bars in any desired way. This construction provides an anti-friction bearing upon the harrow-plates for the rear end of the clevis-bars, and removes a great part of the lateral strain thrown upon the pivot-bolts caused by the upward draft upon said bars during the operation of the harrow, as will be readily seen.

H H represent small wheels journaled in the forked lower ends of rods I, which slide vertically in bearings located between the parallel bars E' of the cross-frame E. These wheels are pressed downward by springs J, acting between a collar or shoulder, K, on the lower end of an adjusting-tube, L, and a shoulder, K', on each rod. The adjusting-tubes L are provided with a collar, K, at or near their lower end, and with a suitable handle, such as L', at their upper extremity, and their body portion is screw-threaded upon its outer surface, so as to be screwed up and down in a threaded passage formed in the brackets M.

The brackets M, I may term the "adjusting-frames" of the harrow, and they are mounted upon the upper side of cross-frame E, one leg resting upon one of the bars E' and the other leg resting upon the other, as shown.

It will be observed that the upper end of the rods I enter the lower end of the adjusting-tubes L, and are guided thereby in a substantially vertical line during the operation of the harrow and during the adjusting operation.

During the operation of the harrow it is intended to impose from one to twenty-five pounds pressure upon the harrow-plates, which can be readily accomplished by the construction shown, the rider having simply to reach down to the side of his seat to change the pressure from light to heavy, and vice versa.

The wheels H tend to depress the harrow-plates at their adjacent sides, which depression causes the teeth at those sides to run deeper in the ground than the teeth at the opposite sides do, thereby retarding the depressed sides and causing the harrow-plates to rotate by the act of advancing the implement.

In addition to forming a very strong and durable frame for the teeth of the harrows, the metallic tooth-plates A serve also as hoods to keep stalks down among the teeth, where the stalks will be broken up and ground to pieces.

In the varied form of adjusting devices for the pressure-wheels shown in Fig. 4 a lever, 14, is arranged upon the upper part of the adjusting-frame M. One of its ends is fulcrumed to a lug, 15, on said frame, and the other is provided with a hand-hold and retaining devices for engaging a sector-bar, 16, which is also located on the frame. The upper end of the adjusting-tube is pivoted to said lever, as shown, and said tube can be raised or lowered in said frame to adjust the tension of the spring to any desired degree.

I do not herein broadly claim a rotary toothed harrow-plate in combination with a spring-actuated caster-wheel adapted to bear upon the upper surface of said rotary plate, as such is shown and described in my former patent, No. 325,932.

Having thus described my invention, what I claim is—

1. In a rotary harrow, the combination of a rotary toothed plate provided with an embossment upon its upper surface, formed integral with said plate and surrounding its pivotal point, whereby a suitable bearing is formed therefor, a clevis-bar pivoted to and resting upon said embossment, and a cross-frame resting upon said clevis-bar, substantially as described.

2. In a rotary harrow, a rotary toothed harrow-plate pivoted to a suitable frame, in combination with a caster-wheel adapted to bear upon the upper surface of said plate, a vertical rod, in the lower end of which the caster-wheel is pivoted, a spiral spring encircling the central part of said rod, an adjusting-tube, in which the upper end of said rod is loosely confined and against the lower end of which the upper part of the spring bears, a stationary frame, in which said tube is adjustably confined, and means by which said adjusting-tube can be raised and lowered independent of said frame, whereby the tension of the spring upon the caster-wheel can be regulated, substantially as described.

3. In a rotary harrow, a toothed plate having a plane upper surface and an embossment surrounding its pivotal point and formed integral with the body portion thereof, substantially as described.

4. In a rotary harrow, a clevis-bar having upon its rear extremity a metal strap, $h$, provided with a fork, $h''$, and apertures $h'''$, in combination with a roller, $h'$, journaled in the fork of said strap, said roller being adapted to bear upon the upper surface of the tooth-frame, substantially as described.

5. The combination, in a rotary harrow, of a pair of rotary tooth-plates having a substantially vertical axis, a frame connecting said plates together, each plate being provided with a spring-actuated roller held by said connecting-frame and adapted to press down one side of the tooth-plate, and a clevis-bar having a roller, also adapted to bear upon the tooth-plate, for the purpose substantially as set forth.

In testimony whereof I affix my signature in the presence of two witnesses.

JAMES R. HICKS.

Witnesses:
A. SAVAGE,
F. G. FISCHER.